United States Patent
Peng et al.

(10) Patent No.: US 9,836,085 B2
(45) Date of Patent: Dec. 5, 2017

(54) PORTABLE DOCKING DEVICE CAPABLE OF PROJECTING VIDEO CONTENT

(71) Applicant: SINBON ELECTRONICS COMPANY LTD., New Taipei (TW)

(72) Inventors: Kuo-Hua Peng, New Taipei (TW); Hsin-Wei Huang, New Taipei (TW); Chia-Ching Lin, New Taipei (TW)

(73) Assignee: SINBON ELECTRONICS COMPANY LTD., New Taipei (TW)

( * ) Notice: Subject to any disclaimer, the term of this patent is extended or adjusted under 35 U.S.C. 154(b) by 176 days.

(21) Appl. No.: 14/946,345

(22) Filed: Nov. 19, 2015

(65) Prior Publication Data

US 2017/0102736 A1 Apr. 13, 2017

(30) Foreign Application Priority Data

Oct. 8, 2015 (TW) .............................. 104216164 U (51) Int. Cl.
*G06F 1/16* (2006.01)
*G06F 1/26* (2006.01)
*G06F 13/40* (2006.01)

(52) U.S. Cl.
CPC .............. *G06F 1/1632* (2013.01); *G06F 1/26* (2013.01); *G06F 1/266* (2013.01); *G06F 13/4022* (2013.01); *G06F 13/4081* (2013.01)

(58) Field of Classification Search
CPC ........... G06F 1/1632; G06F 1/26; G06F 1/266
See application file for complete search history.

(56) References Cited

U.S. PATENT DOCUMENTS

| 2008/0278894 | A1* | 11/2008 | Chen ..................... | G06F 1/1632 361/679.01 |
| 2009/0059511 | A1* | 3/2009 | Chu ........................ | G06F 1/1632 361/679.41 |
| 2012/0210034 | A1* | 8/2012 | Ko .......................... | H04M 1/04 710/303 |
| 2013/0182194 | A1* | 7/2013 | Liao ....................... | G03B 21/54 348/744 |
| 2013/0297844 | A1* | 11/2013 | Rosenberg ............ | G06F 1/1632 710/303 |
| 2014/0035518 | A1* | 2/2014 | Chen ..................... | G06F 1/1632 320/108 |
| 2015/0133204 | A1* | 5/2015 | Ivanovski ............ | H04B 1/3816 455/575.8 |

* cited by examiner

*Primary Examiner* — Glenn A Auve
(74) *Attorney, Agent, or Firm* — Rabin & Berdo, P.C.

(57) ABSTRACT

Provided is a portable docking device. The portable docking device may convert an USB Type-C port to another type of port. The portable docking device can further receive electric power from a mobile device connected with the portable docking device, and the pico-projecting unit can receive the electric power to project an enlarged screen synchronous to a screen displayed on the mobile device. Therefore, the screen displayed on the mobile device can be enlarged, and viewers can watch the enlarged screen without the viewers' sight being blocked. Further, the user of the portable docking device does not need to bring a power adaptor, and convenience and portability of the portable docking device can be improved.

17 Claims, 5 Drawing Sheets

PORTABLE DOCKING DEVICE CAPABLE OF PROJECTING VIDEO CONTENT

BACKGROUND OF THE INVENTION

1. Field of the Invention

The present invention relates to a docking device, and more particularly to a portable docking device capable of projecting video content.

2. Description of the Related Art

A mobile device may be connected to a larger monitor or a projector through a VGA (Video Graphics Array) cable or a HDMI (High Definition Multimedia Interface) cable, and video content of the mobile device can be displayed on the larger monitor or by the projector, such that a user of the mobile device can enjoy watching the video content on a larger screen. The mobile device may further have a RJ45 connector, and can be connected to a router by a RJ45 cable. Then, the user can connect to the Internet by the mobile device.

When the larger monitor or the projector is not available, the video content of the mobile device cannot be displayed on the larger screen. Therefore, when many viewers watch the video content displayed on the mobile device, some of the viewers may block the remaining viewers' sight.

The mobile device is miniaturized to raise portability of the mobile device, and the miniaturized mobile device can be easily carried. Therefore, standard connectors, such as the VGA connector, the HDMI connector, and the RJ45 connector, may not be connected to the miniaturized mobile device because volume of the standard connectors cannot be miniaturized.

A conventional docking station having the standard connectors is used to connect the miniaturized mobile device through a miniaturized connector. Therefore the miniaturized mobile device can be adapted to the standard connectors. For example, a micro USB port of the miniaturized mobile device can be adapted to a HDMI port by the docking station.

However, the conventional docking station can only be an adaptor to transmit data, and cannot synchronously transmit electric power. Therefore, when the conventional docking station includes units consuming electric power, such as a loudspeaker, the docking station further needs to connect to a power source by a power adaptor. When the user wants to use the docking station, the user further needs to carry the power adaptor, causing inconvenience.

SUMMARY OF THE INVENTION

An objective of the present invention is to provide a portable docking device capable of projecting video content.

To achieve the foregoing objective, the portable docking device capable of projecting video content comprises a USB TYPE-C™ port, a first switch, a DC/DC convertor, a power delivery controller, a second switch, a system power terminal, a micro processor, a USB hub, a connecting module, and a pico-projecting unit.

The USB TYPE-C™ port comprises a cable connecting terminal to be connected to a cable, a signal transmitting terminal, and a power transmitting terminal.

The first switch is connected to the power transmitting terminal of the USB TYPE-C™ port. The DC/DC convertor comprises an input and an output, and the input is connected to the power transmitting terminal of the TYPE-C™ port through the first switch.

The power delivery controller is connected to the power transmitting terminal of the USB TYPE-C™ port to receive a power detecting signal, and is connected to the first switch to turn on or off the first switch according to the power detecting signal.

When the power delivery controller turns on the first switch, the power transmitting terminal of the USB TYPE-C™ port is connected to the input of the DC/DC convertor.

The second switch is connected to the output of the DC/DC convertor. The system power terminal is connected to the output of the DC/DC convertor through the second switch.

The micro processor is connected to the power delivery controller to receive a control signal, and is connected to the second switch to turn on or off the second switch according to the control signal. When the power delivery controller turns on the first switch, the micro processor turns on the second switch, such that the output of the DC/DC convertor is connected with the system power terminal.

The USB hub is connected to the signal transmitting terminal of the USB TYPE-C™ port. The connecting module is connected to the USB hub. The pico-projecting unit is connected to the system power terminal to receive electric power, and is connected to the connecting module.

The portable docking device detects whether a mobile device is capable of providing electric power according to the power detecting signal received by the power delivery controller. The mobile device is connected to the USB TYPE-C™ port through the cable. When the mobile device is capable of providing electric power, the first switch and the second switch are turned on. Therefore, the electric power supplied by the mobile device can be transmitted to the system power terminal, and the pico-projecting unit can receive electric power from the system power terminal and can be normally operated to project video content. When the mobile device is incapable of providing electric power, the first switch and the second switch are turned off. Therefore, the pico-projecting unit cannot receive the electric power. When the mobile device is incapable of providing the electric power, the portable docking device can still receive signals from the mobile device by the USB TYPE-C™ port, and output the signals by the connecting module.

The pico-projecting unit can receive electric power and the signals from the mobile device, and projects an enlarged screen synchronous to the screen displayed on the mobile device. Therefore, viewers can watch the enlarged screen and the viewers' sight may not be blocked. Further, the mobile device is capable of providing the electric power, and a user of the portable docking device does not need to bring a power adaptor. The user just brings the portable docking device and the mobile device, and the enlarged screen can be projected.

Other objectives, advantages and novel features of the invention will become more apparent from the following detailed description when taken in conjunction with the accompanying drawings.

DETAILED DESCRIPTION OF THE INVENTION

Figure 1:
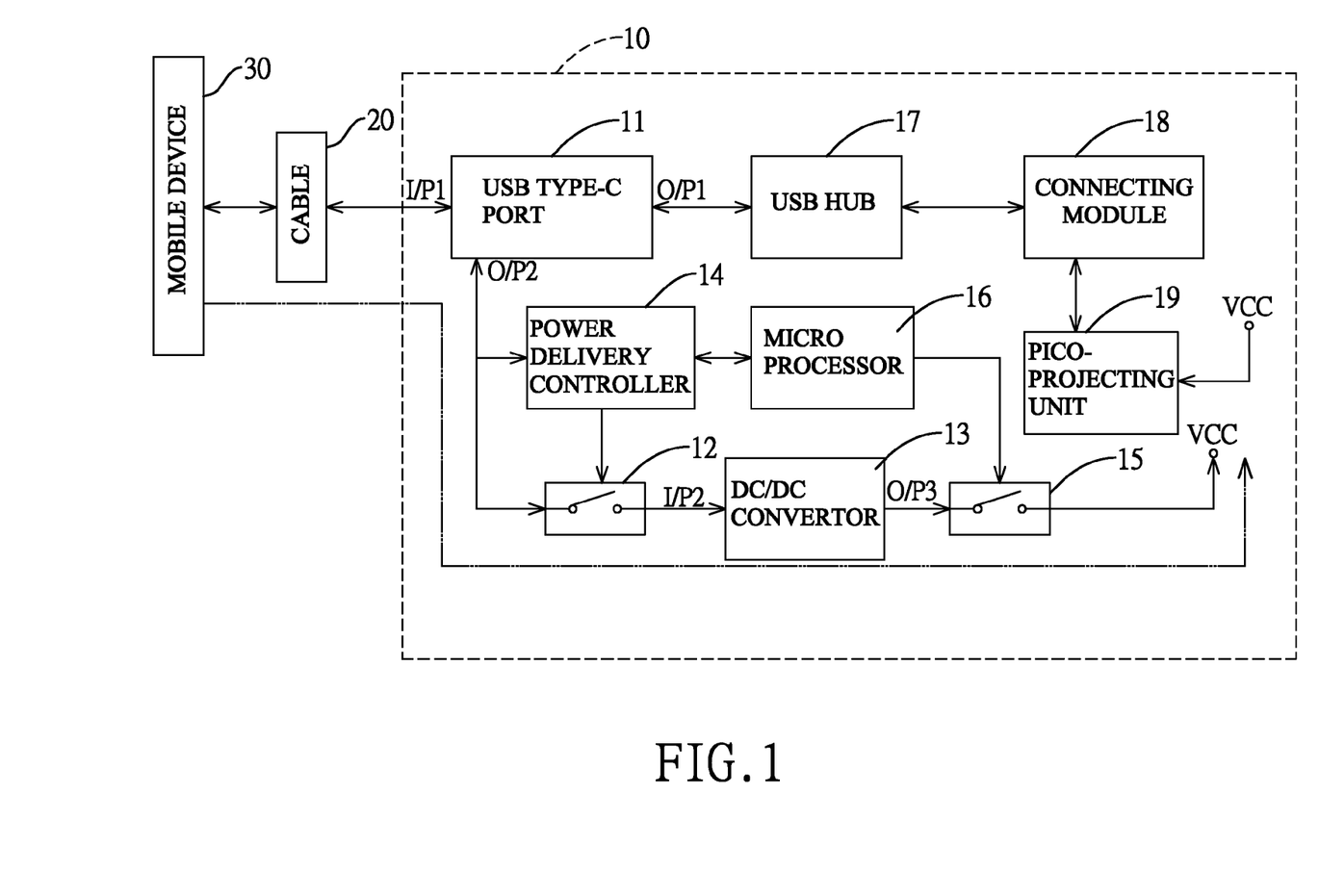
FIG. 1 is a system block diagram of an embodiment of the present invention.

With reference to FIG. 1, the present invention is a portable docking device 10 capable of projecting video content. A first embodiment of the portable docking device 10 is shown in FIG. 1. The portable docking device 10 comprises a USB (universal serial 10 bus) TYPE-C™ port 11, a first switch 12, a DC/DC convertor 13, a power delivery controller 14, a second switch 15, a micro processor 16, a USB hub 17, a connecting module 18, and a pico-projecting unit 19.

The USB TYPE-C™ port 11 comprises a cable connecting terminal I/P1 to connect a cable 20, a signal transmitting terminal O/P1, and a power transmitting terminal O/P2. The first switch 12 is connected to the power transmitting terminal O/P2 of the USB TYPE-C™ port 11. The DC/DC convertor 13 comprises an input I/P2 and an output O/P3. The input I/P2 of the DC/DC convertor 13 is connected to the power transmitting terminal O/P2 of the USB TYPE-C™ port 11 through the first switch 12. A mobile device 30 is connected to the USB TYPE-C™ port 11 through the cable 20.

The power delivery controller 14 is connected to the power transmitting terminal O/P2 of the USB TYPE-C™ port 11 to receive a power detecting signal, and the power delivery controller 14 determines whether the mobile device 30 is capable of providing electric power. The power delivery controller 14 is further connected to the first switch 12 to turn on or off the first switch 12 according to the power detecting signal. When the power delivery controller 14 determines that the mobile device 30 is capable of providing the electric power, the power delivery controller 14 turns on the first switch 12, and the power transmitting terminal O/P2 of the USB TYPE-C™ port 11 can be connected to the input I/P2 of the DC/DC convertor 13.

The second switch 15 is connected to the output O/P3 of the DC/DC convertor 13. A system power terminal VCC is connected to the output O/P3 of the DC/DC convertor 13 through the second switch 15. The micro processor 16 is connected to the power delivery controller 14 to receive a control signal, and is connected to the second switch 15 to turn on or off the second switch 15 according to the control signal. When the power delivery controller 14 turns on the first switch 12, the micro processor 16 turns on the second switch 15, such that the output O/P3 of the DC/DC convertor 13 is connected with the system power terminal VCC. In this embodiment, a model number of the micro processor 16 may be STM8S103K.

The USB hub 17 is connected to the signal transmitting terminal O/P1 of the USB TYPE-C™ port 11. The connecting module 18 is connected to the USB hub 17. The pico-projecting unit 19 is connected to the system power terminal VCC to receive electric power, and is connected to the connecting module 18. In the embodiment, a model number of the USB hub 17 may be GL3532-S.

When a user uses the portable docking device 10, the user connects the mobile device 30 with the USB TYPE-C™ port 11 of the portable docking device 10 through the cable 20. Then, the mobile device 30 is capable of providing electric power and transmitting data to the portable docking device 10 through the cable 20.

The power delivery controller 14 of the portable docking device 10 connects to the USB TYPE-C™ port 11, such that the power delivery controller 14 receives the power detecting signal through the cable 20 to determine whether the mobile device 30 is capable of providing electric power to the pico-projecting unit 19. When the mobile device 30 is capable of providing the electric power, the power delivery controller 14 turns on the first switch 12, and the mobile device 30 is capable of providing electric power to the pico-projecting unit 19 through the first switch 12, the DC/DC convertor 13, and the second switch 15. In the embodiment, a model number of the DC/DC convertor 13 may be NB679, and a model number of the power delivery controller 14 may be RT7800.

Further, the mobile device 30 may transmit data to the portable docking device 10 through the cable 20. When the portable docking device 10 receives the data from the cable connecting terminal I/P1 of the USB TYPE-C® port 11, the portable docking device 10 transmits the data to the USB hub 17 through the signal transmitting terminal O/P1 and further transmits the data to the pico-projecting unit 19 through the connecting module 18. Therefore, when the power delivery controller 14 determines that the mobile device 30 is capable of providing the electric power, the pico-projecting unit 19 may receive the electric power and the data. The electric power provided by the mobile device 30 may be transmitted to the pico-projecting unit 19 because of the first switch 12 and the second switch 15 being turned on, and the data may be transmitted to the pico-projecting unit 19 through the USB TYPE-C™ port 11, the USB hub 17, and the connecting module 18. Then the pico-projecting unit 19 may project an enlarged screen synchronous to the screen displayed on the mobile device 30. Viewers can watch the enlarged screen, and the viewers' sight may not be blocked. Further, the mobile device 30 may be capable of providing electric power, and a user of the portable docking device 10 does not need to bring a power adaptor. The user just brings the portable docking device 10 and the mobile device 30, and the enlarged screen can be projected.

Figure 2:
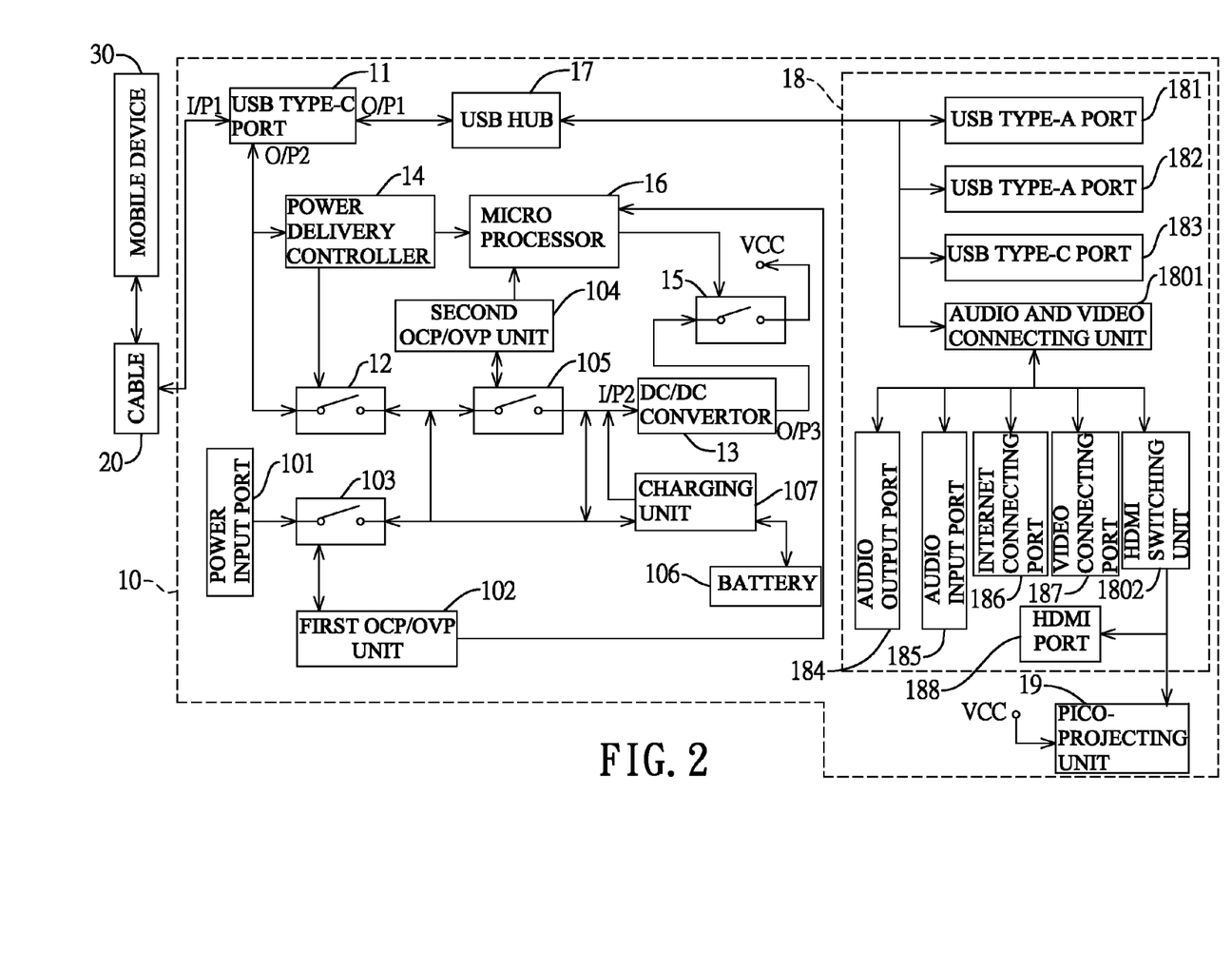
FIG. 2 is a system block diagram of another embodiment of the present invention.

With reference to FIG. 2, a second embodiment of the portable docking device 10 is shown. The second embodiment of the portable docking device 10 further comprises a power input port 101, a first OCP (over current protection)/OVP (over voltage protection) unit 102, a third switch 103, a second OCP/OVP unit 104, a fourth switch 105, a battery 106, and a charging unit 107.

The power input port 101 is configured to receive an external direct current, such as connecting to an external power source through a power adaptor.

The third switch 103 is connected between the power input port 101 and the charging unit 107. A node connected by the third switch 103 and the charging unit 107 is further connected to the input I/P2 of the DC/DC convertor 13, such that the third switch 103 is connected to the input I/P2 of the DC/DC convertor 13.

The first OCP/OVP unit 102 is connected to the third switch 103 to detect whether a current/voltage value entering the third switch 103 is within a power setting range. When the current/voltage value is lower than a fixed current/voltage value, or higher than a protective current/voltage value, the current/voltage value is considered out of the power setting range. When the current/voltage value is within the power setting range, the first OCP/OVP unit 102 turns on the third switch 103. When the current/voltage value is out of the power setting range, the first OCP/OVP unit 102 turns off the third switch 103. Therefore, the current/voltage having a value which is out of the power setting range cannot enter the portable docking device 10, and electronic element in the portable docking device 10 would not be damaged by the current/voltage.

The fourth switch 105 is connected between the first switch 12 and the input I/P2 of the DC/DC convertor 13. A node connected by the fourth switch 105 and the first switch 12 is further connected to the node connected by the DC/DC converter 13, the third switch 103, and the charging unit 107.

The second OCP/OVP unit 104 is connected to the fourth switch 105 to detect whether a current/voltage value entering the fourth switch 105 is within the power setting range. The second OCP/OVP unit 104 turns on the fourth switch 105 when the current/voltage value entering the fourth switch 105 is within the power setting range, and turns off the fourth switch 105 when the current/voltage value entering the fourth switch 105 is out of the power setting range. Therefore, the electronic element in the portable docking device 10 can be protected by the second OCP/OVP unit 104. In the embodiment, the model number of the first OCP/OVP unit 102 and the second OCP/OVP unit 104 is LT4363.

The micro processor 16 is connected to the first OCP/OVP unit 102 to receive a first control signal to determine whether the third switch 103 is turned on, and is connected to the second OCP/OVP unit 104 to receive a second control signal to determine whether the fourth switch 105 is turned on. The micro processor 16 further controls the second switch 15 according to the first control signal and the second control signal.

The charging unit 107 is connected to the input I/P2 of the DC/DC convertor 13. The battery 106 is connected to the charging unit 107. When the battery 106 is discharging, the charging unit 107 outputs electric power of the battery 106 to the input I/P2 of the DC/DC convertor 13. When the battery 106 is charging, the charging unit 107 receives electric power to charge the battery 106. In the embodiment, a model number of the charging unit 107 is BQ24610.

The connecting module 18 comprises at least one USB Type-A port 181,182, a USB TYPE-C™ port 183, an audio output port 184, an audio input port 185, an internet connecting port 186, a video connecting port 187, a HDMI port 188, an audio and video connecting unit 1801, and a HDMI switching unit 1802. The USB Type-A port 181, the USB TYPE-C™ port 183 and the audio and video connecting unit 1801 are connected to the USB hub 17. The audio output port 184, the audio input port 185, the internet connecting port 186, the video connecting port 187, and the HDMI switching unit 1802 are connected to the audio and video connecting unit 1801. The HDMI port 188 and the pico-projecting unit 19 are connected to the HDMI switching unit 1802. In the embodiment, the connecting module 18 comprises two USB Type-A ports 181,182. The audio output port 184 is an audio jack port. The audio input port 185 is a microphone jack port. The internet connecting port 186 is a RJ-45 port. The video connecting port 187 is a DVI (Digital Visual interface) port.

Figure 3:
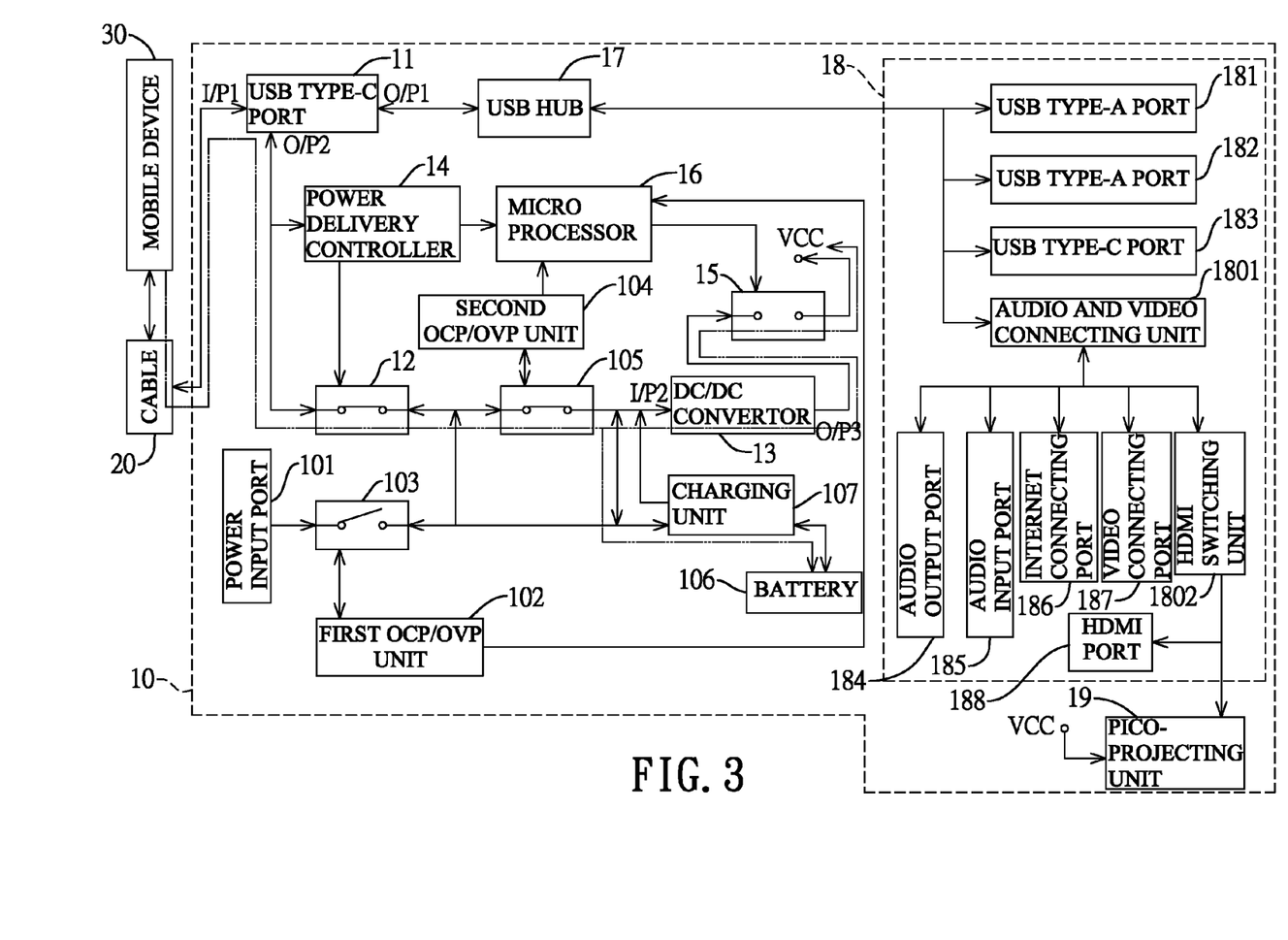
FIG. 3 is a schematic diagram of a current flow direction when electric power is provided by a mobile device.

With reference to FIG. 3, when the power delivery controller 14 determines that the mobile device 30 is capable of providing electric power according to the power detecting signal, the power delivery controller 14 turns on the first switch 12. There is no current flowing through the third switch 103. Therefore, the current/voltage value entering the third switch 103 may be lower than the fixed current/voltage value, and is out of the power setting range, and the first OCP/OVP unit 102 turns off the third switch 103. The electric power provided by the mobile device 30 is transmitted to the fourth switch 105 through the first switch 12. When the power delivery controller 14 determines that the mobile device 30 is capable of providing electric power, the current/voltage value entering the fourth switch 105 may meet the power setting range, and the second OCP/OVP unit 104 turns on the fourth switch 105. Then, the electric power provided by the mobile device 30 can be transmitted from the USB TYPE-C™ port 11, through the first switch 12 and the fourth switch 105, and to the input I/P2 of the DC/DC convertor 13.

The micro processor 16 determines that the first switch 12 is turned on by the power delivery controller 14, determines that the third switch 103 is turned off by the first OCP/OVP unit 102, and determines that the fourth switch 105 is turned on by the second OCP/OVP unit 104. Therefore, the micro processor 16 determines that the electric power is provided by the mobile device 30, and turns on the second switch 15.

Then the electric power provided by the mobile device 30 can be further transmitted from the output O/P3 of the DC/DC convertor 13 to the system power terminal VCC, and the pico-projecting unit 19 can receive the electric power provided by the mobile device 30 from the system power terminal VCC. The electric power provided by the mobile device 30 is further transmitted to the charging unit 107 to charge the battery 106.

Therefore, when the mobile device 30 is capable of providing electric power, the pico-projecting unit 19 can receive the electric power to project the enlarged screen synchronous to the screen displayed on the mobile device 30 and the charging unit 107 can receive the electric power to charge the battery 106.

Figure 4:
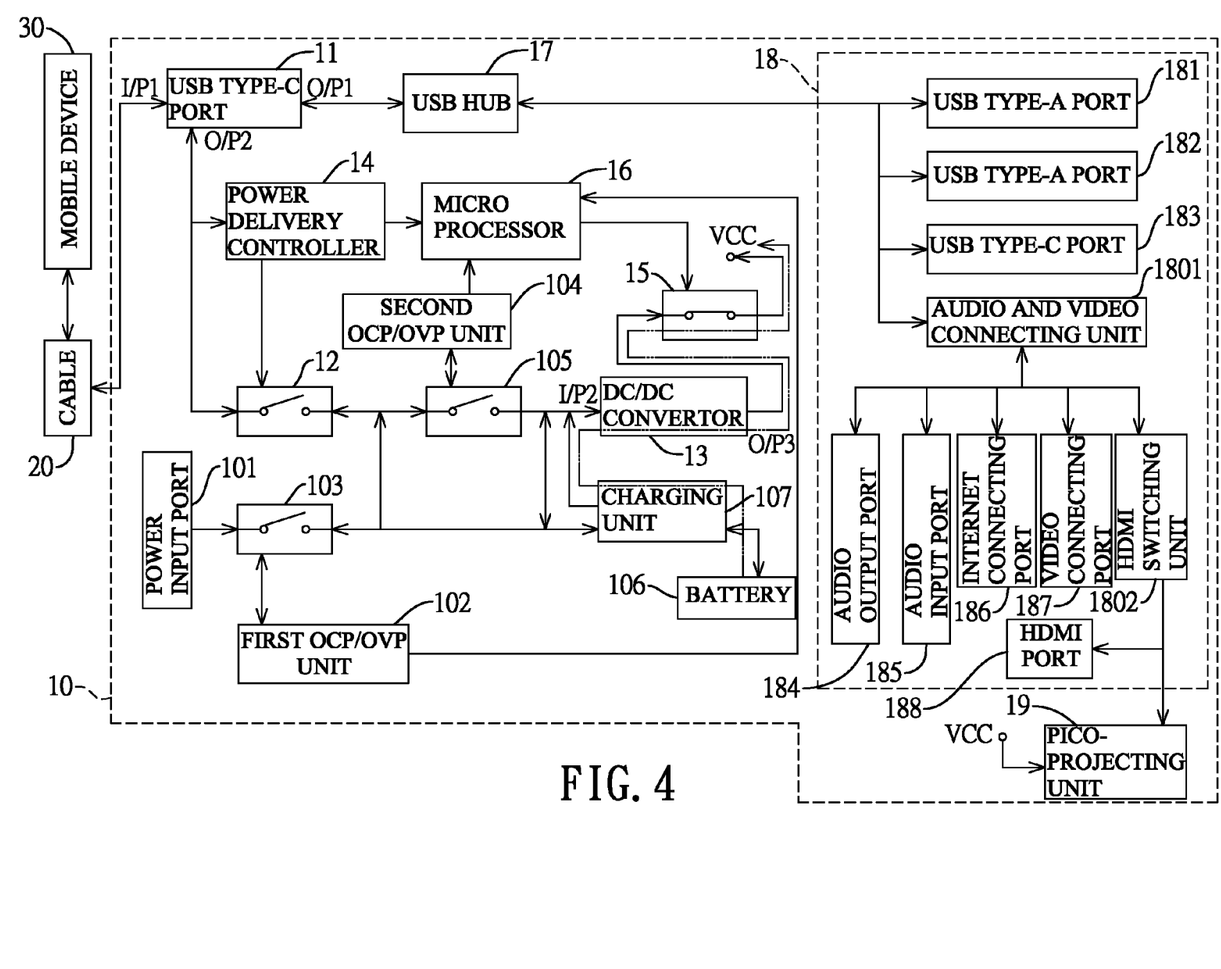
FIG. 4 is a schematic diagram of a current flow direction when electric power is provided by a battery.

With reference to FIG. 4, when the power delivery controller 14 determines that the mobile device 30 is incapable of providing electric power according to the power detecting signal, the power delivery controller 14 turns off the first switch 12. When the first switch 12 is turned off, there is no current flowing through the fourth switch 105. Therefore, the current/voltage value entering the fourth switch 105 may be lower than the fixed current/voltage value, and is out of the power setting range, and the second OCP/OVP unit 104 turns off the fourth switch 105. Further, there is no current flowing through the third switch 103. Therefore, the current/voltage value entering the third switch 103 may be lower than the fixed current/voltage value, and is out of the power setting range, and the first OCP/OVP unit 102 turns off the third switch 103. The battery 106 outputs electric power to the charging unit 107, and the electric power provided by the battery 106 can be transmitted to the input I/P2 of the DC/DC convertor 13 through the charging unit 107.

The micro processor 16 determines that the first switch 12 is turned off by the power delivery controller 14, determines that the third switch 103 is turned off by the first OCP/OVP unit 102, and determines that the fourth switch 105 is turned off by the second OCP/OVP unit 104. Therefore, the micro processor 16 determines that the electric power is provided by the battery 106, and turns on the second switch 15. Then the electric power provided by the battery 106 can be further transmitted from the output O/P3 of the DC/DC convertor 13 to the system power terminal VCC, and the pico-projecting unit 19 can receive the electric power provided by the battery 106 from the system power terminal VCC.

Figure 5:
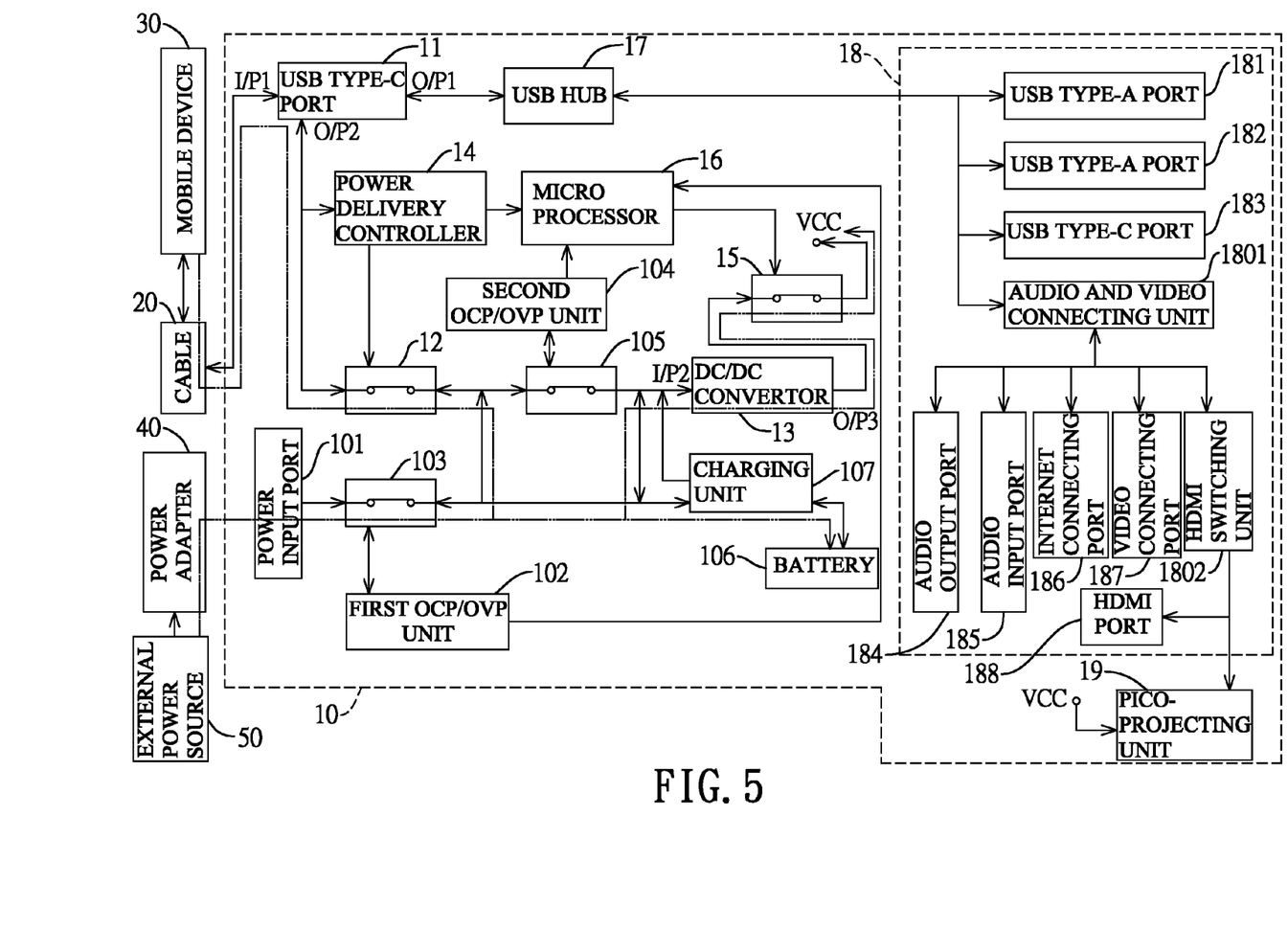
FIG. 5 is a schematic diagram of a current flow direction when electric power is provided by an external power source.

With reference to FIG. 5, when the power input port 101 is connected to an external power source 50 through a power adapter 40, the external power source 50 is capable of providing electric power to the portable docking device 10. The electric power provided by the external power source 50 is transmitted to the third switch 103 through the power input port 101. When the external power source 50 is capable of providing electric power, the current/voltage value entering the third switch 103 may meet the power setting range, and the first OCP/OVP unit 102 turns on the third switch 103. Therefore, the electric power provided by the external power source 50 can be transmitted to the charging unit 107 to charge the battery 106. The electric power provided by the external power source 50 is further transmitted to the input I/P2 of the DC/DC convertor 13.

The micro processor 16 determines that the third switch 103 is turned on by the first OCP/OVP unit 102. Therefore, the micro processor 16 determines that the electric power is provided by the external power source 50, and turns on the second switch 15. Then the electric power provided by the external power source 50 can be further transmitted from the output O/P3 of the DC/DC convertor 13 to the system power terminal VCC, and the pico-projecting unit 19 can receive the electric power provided by the external power source 50 from the system power terminal VCC.

Further, the power delivery controller 14 determines that the third switch 103 is turned on by the micro processor 16, and the electric power is provided by the external power source 50. Therefore, the power delivery controller 14 turns on the first switch 12, and the electric power provided by the external power source 50 can be transmitted to the mobile device 30 through the first switch 12, the USB TYPE-C™ port 11, and the cable 20, to charge the mobile device 30.

How the micro processor 16 turns on or off the second switch 15 can be summarized as shown in the following table:

|  | first switch 12 | third switch 103 | fourth switch 105 | second switch 15 |
|---|---|---|---|---|
| The electric power is provided by the mobile device 30. | On | Off | On | On |
| The electric power is provided by the battery 106. | Off | Off | Off | On |
| The electric power is provided by the external power source 50. | On | Off | On | On |

In the embodiment, the pico-projecting unit 19 can receive the electric power from the mobile device 30, and projects the enlarged screen synchronous to the screen displayed on the mobile device 30 by the pico-projecting unit 19. Therefore, the viewers can watch the enlarged screen, and the viewers' sight may not be blocked. Further, the user of the portable docking device 10 does not need to bring a power adaptor, and the pico-projecting unit 19 can project the enlarged screen. Convenience and portability of the portable docking device 10 can be improved. In the other embodiment of the portable docking device 10, the pico-projecting unit 19 can further receive electric power from the battery 106 or the external power source 50. Therefore, the convenience of the portable docking device 10 can be further improved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A portable docking device capable of projecting video content, the portable docking device comprising:
   a USB TYPE-C™ port comprising a cable connecting terminal to be connected to a cable, a signal transmitting terminal, and a power transmitting terminal;
   a first switch connected to the power transmitting terminal of the USB TYPE-C™ port;
   a DC/DC convertor comprising an input and an output, wherein the input is connected to the power transmitting terminal of the USB TYPE-C™ port through the first switch;
   a power delivery controller connected to the power transmitting terminal of the USB TYPE-C™ port to receive a power detecting signal, and connected to the first switch to turn on or off the first switch according to the power detecting signal;
   a second switch connected to the output of the DC/DC convertor;
   a system power terminal connected to the output of the DC/DC convertor through the second switch;
   a micro processor connected to the power delivery controller to receive a control signal, and connected to the second switch to turn on or off the second switch according to the control signal; wherein when the power delivery controller turns on the first switch, the micro processor turns on the second switch, such that the output of the DC/DC convertor is connected with the system power terminal;
   a USB hub connected to the signal transmitting terminal of the USB TYPE-C™ port;
   a connecting module connected to the USB hub; and
   a pico-projecting unit connected to the system power terminal to receive electric power, and the pico-projecting unit connected to the connecting module.

2. The portable docking device as claimed in claim 1 further comprising:
   a power input port;
   a third switch connected between the power input port and the input of the DC/DC convertor; and
   a first OCP (over current protection)/OVP (over voltage protection) unit connected to the third switch to determine whether a current/voltage value entering the third switch is within a power setting range; wherein when the current/voltage value is within the power setting range, the first OCP/OVP unit turns on the third switch; wherein when the current/voltage value is out of the power setting range, the first OCP/OVP unit turns off the third switch.

3. The portable docking device as claimed in claim 2, wherein:
   the micro processor is connected to the first OCP/OVP unit to determine whether the third switch is turned on; and
   when the power delivery controller determines that the third switch is turned on by the micro processor, the power delivery controller turns on the first switch.

4. The portable docking device as claimed in claim 3, further comprising:
   a fourth switch, connected between the first switch and the input of the DC/DC convertor; wherein a node connected by the fourth switch and the first switch is further connected to a node connected by the third switch and the DC/DC convertor; and a second OCP/OVP unit, connected to the fourth switch to detect whether a current/voltage value entering the fourth switch is within the power setting range; wherein when the current/voltage value is within the power setting range, the second OCP/OVP unit turns on the fourth switch; wherein when the current/voltage value is out of the power setting range, the second OCP/OVP unit turns off the fourth switch.

5. The portable docking device as claimed in claim 4, wherein:
the micro processor is connected to the first OCP/OVP unit to receive a first control signal to determine whether the third switch is turned on, and is connected to the second OCP/OVP unit to receive a second control signal to determine whether the fourth switch is turned on; and
the micro processor further controls the second switch according to the first control signal and the second control signal.

6. The portable docking device as claimed in claim 5, further comprising:
a charging unit, connected to the input of the DC/DC convertor;
a battery, connected to the charging unit.

7. The portable docking device as claimed in claim 4, further comprising:
a charging unit, connected to the input of the DC/DC convertor;
a battery, connected to the charging unit.

8. The portable docking device as claimed in claim 3, further comprising:
a charging unit, connected to the input of the DC/DC convertor;
a battery, connected to the charging unit.

9. The portable docking device as claimed in claim 2, further comprising:
a fourth switch connected between the first switch and the input of the DC/DC convertor; wherein a node connected by the fourth switch and the first switch is further connected to a node connected by the third switch and the DC/DC convertor; and
a second OCP/OVP unit connected to the fourth switch to detect whether a current/voltage value entering the fourth switch is within the power setting range; wherein when the current/voltage value is within the power setting range, the second OCP/OVP unit turns on the fourth switch; wherein when the current/voltage value is out of the power setting range, the second OCP/OVP unit turns off the fourth switch.

10. The portable docking device as claimed in claim 9, wherein:
the micro processor is connected to the first OCP/OVP unit to receive a first control signal to determine whether the third switch is turned on, and is connected to the second OCP/OVP unit to receive a second control signal to determine whether the fourth switch is turned on; and
the micro processor further controls the second switch according to the first control signal and the second control signal.

11. The portable docking device as claimed in claim 10, further comprising:
a charging unit, connected to the input of the DC/DC convertor;
a battery, connected to the charging unit.

12. The portable docking device as claimed in claim 9, further comprising:
a charging unit, connected to the input of the DC/DC convertor;
a battery, connected to the charging unit.

13. The portable docking device as claimed in claim 2, further comprising:
a charging unit, connected to the input of the DC/DC convertor;
a battery, connected to the charging unit.

14. The portable docking device as claimed in claim 1, further comprising:
a fourth switch connected between the first switch and the input of the DC/DC convertor; wherein a node connected by the fourth switch and the first switch is connected to a node connected by the third switch and the DC/DC convertor; and
a second OCP/OVP unit connected to the fourth switch to detect whether a current/voltage value entering the fourth switch is within a power setting range; wherein when the current/voltage value is within the power setting range, the second OCP/OVP unit turns on the fourth switch; wherein when the current/voltage value is out of the power setting range, the second OCP/OVP unit turns off the fourth switch.

15. The portable docking device as claimed in claim 14, further comprising:
a charging unit, connected to the input of the DC/DC convertor;
a battery, connected to the charging unit.

16. The portable docking device as claimed in claim 1, further comprising:
a charging unit, connected to the input of the DC/DC convertor;
a battery, connected to the charging unit.

17. The portable docking device as claimed in claim 1, wherein the connecting module comprises any one of at least one USB Type-A port, a USB TYPE-C™ port, an audio output port, an audio input port, an internet connecting port, a video connecting port, and a HDMI port, or any combination thereof.

* * * * *